(12) United States Patent
Kimiabeigi

(10) Patent No.: US 8,779,640 B2
(45) Date of Patent: Jul. 15, 2014

(54) STATOR ARRANGEMENT

(75) Inventor: Mohammad Kimiabeigi, Sheffield (GB)

(73) Assignee: Siemens Aktiengesellschaft, Munich (DE)

( * ) Notice: Subject to any disclaimer, the term of this patent is extended or adjusted under 35 U.S.C. 154(b) by 113 days.

(21) Appl. No.: 13/413,052

(22) Filed: Mar. 6, 2012

(65) Prior Publication Data

US 2012/0228969 A1  Sep. 13, 2012

(30) Foreign Application Priority Data

Mar. 9, 2011  (EP) .................................... 11157464

(51) Int. Cl.
*H02K 9/00*  (2006.01)

(52) U.S. Cl.
USPC ............................................. 310/59; 310/54

(58) Field of Classification Search
USPC ..................................................... 310/52–59
See application file for complete search history.

(56) References Cited

U.S. PATENT DOCUMENTS

| 5,866,960 | A | * | 2/1999 | Meier et al. | 310/59 |
| 5,973,427 | A | * | 10/1999 | Suzuki et al. | 310/54 |
| 6,661,124 | B1 | * | 12/2003 | Seki et al. | 310/12.21 |
| 7,282,821 | B2 | * | 10/2007 | Kubo et al. | 310/12.15 |
| 8,368,258 | B2 | * | 2/2013 | Sugita et al. | 310/12.29 |
| 2005/0285451 | A1 | | 12/2005 | Emoto et al. | |

FOREIGN PATENT DOCUMENTS

EP        2136455 A1   12/2009
WO   WO 2004073144 A1   8/2004

* cited by examiner

*Primary Examiner* — Thanh Lam

(57) ABSTRACT

A Stator arrangement for an electric machine includes a stator having a stator yoke with a plurality of stator slots. Each stator slot accommodates at least two adjacently disposed sets of stator windings and at least one cooling device, wherein the at least one cooling device is disposed between the respective adjacently disposed sets of stator windings.

12 Claims, 2 Drawing Sheets

STATOR ARRANGEMENT

CROSS REFERENCE TO RELATED APPLICATIONS

This application claims priority of European Patent Office application No. 11157464.6 EP filed Mar. 9, 2011. All of the applications are incorporated by reference herein in their entirety.

FIELD OF INVENTION

The invention relates to a stator arrangement for an electric machine, comprising a stator having a stator yoke with a number of stator slots, with each stator slot accommodating at least two adjacently disposed sets of stator windings and at least one cooling means.

BACKGROUND OF INVENTION

The operation of an electric machine such as a generator for instance is usually accompanied by great heat densities leading to high temperature gradients within the stator. That is, the problem of excessive heat particularly occurring in the area of the stator, namely caused by so called copper losses, has to be encountered. Hence, it is known to provide respective stator arrangements with respective cooling means in order to provide proper cooling of the stator.

Regarding electric machines having a single-layer configuration, cooling means are regularly inserted in the top or bottom part of the respective stator slots prior to or after installation of the respective sets or layers of stator windings. Thereby, the contact surface between the cooling means and the stator windings is limited, thus thermal exchange and cooling performance is comparatively low.

Another approach for providing proper cooling is to integrate the cooling means in the respective sets of stator windings, i.e. the cooling means is disposed within the stator windings. Thereby, large contact surfaces are possible improving thermal exchange and cooling performance. Yet, this principal is considered as constructively complex and may lead to disadvantages especially in cases of failure since the cooling means are hardly to separate from the stator windings.

SUMMARY OF INVENTION

Hence, it is the object of the invention to provide an approved stator arrangement, particularly in regard of good cooling performance and simple constructive design.

This is inventively achieved by a stator arrangement as described before, wherein the at least one cooling means is disposed between the respective adjacently disposed sets of stator windings.

The present invention provides a novel approach for cooling a stator arrangement, that is particularly the stator windings of a stator having a multi-layer configuration, i.e. the stator comprises at least two sets or layers of stator windings in each stator slot. Thereby, the adjacently disposed sets of stator windings are physically separated by means of the respective cooling means.

That is, for an exemplary embodiment of the stator arrangement having a two-layer configuration, i.e. two sets of stator windings disposed on top of each other, a first set of stator windings is disposed on the bottom of the stator slot, the cooling means is disposed on top of the first set of stator windings and a second set of stator windings is disposed on the cooling means. For an exemplary embodiment of the stator arrangement having a three-layer configuration, i.e. three sets of stator windings disposed on top of each other, a first set of stator windings is disposed on the bottom of the stator slot, a first cooling means is disposed on top of the first set of stator windings and a second set of stator windings is disposed on the first cooling means. A second cooling means is disposed on the second set of stator windings and a third set of stator windings is disposed on the second cooling means. Generally, it is also possible to initially dispose a cooling means in the respective stator slot which is followed by a respective first set of stator windings.

Hence, the inventive principle essentially teaches an alternating arrangement of sets of stator windings and cooling means within the respective stator slots of multi-layer stator configurations. In such a manner, a respective cooling means essentially has two contact sites, i.e. a lower and an upper contact site with the respective adjacently disposed sets of stator windings giving rise to an improved cooling performance and cooling efficiency. Aside, the assembly of the stator is eased, since the respective sets of stator windings and cooling means merely have to be inserted in the respective stator slots in successive manner, that is one after another.

The at least one cooling means is preferably a duct-like pipe. Duct-like pipes are available in different dimensions, that is particularly diameters, lengths, wall thicknesses, etc., and geometric shapes, that is particularly straight, curved, bent, etc., and thus, maybe individually fitted to respective dimensions of the stator and its components. The duct-like pipes are regularly connected to a cooling system providing a fluid, that is liquid or gaseous cooling medium. Thus, the cooling means comprises at least one inlet and at least one outlet adapted to establish a connection or connected to the cooling system.

The duct-like pipe is preferably made of a thermally conductive material, particularly a metal, especially aluminium, copper or stainless steel. Hence, the duct-like pipe offers good mechanical stability, good thermal properties, anti-corrosive properties and may be shaped in diverse geometrical shapes. Of course, other materials having a like spectrum of properties such as polymers filled with thermally conductive particles may be applicable as well.

It is possible that a number of duct-like pipes are connected in series or parallel. In the first case, the outlet of a first duct-like pipe is connected to an inlet of a second duct-like pipe, i.e. the respective duct-like pipes build a closed pipe system extending through large parts of the stator or the entire stator, respectively. In the second case, the respective inlets as well as the respective outlets of the duct-like pipes are connected and further connected to a cooling system. Of course, parts of the stator may comprise a series connection and other parts of the stator may comprise a parallel connection of the respective duct-like pipes in exceptional cases. The decision, whether a series or a parallel connection of duct-like pipes is applied may depend on thermal investigations as well as costs for instance.

In a further embodiment of the invention, the inlet and outlet of the duct-like pipes are disposed on the same face side of the stator yoke. In such a manner, both inlets and outlets are easily accessible which offers advantages in terms of connecting the duct-like pipes to a cooling system for instance. Aside, service and repair are easily executable.

It is of advantage when the ends of at least one set of stator windings are bent in radially upward or downward direction. In such a manner, the insertion and installation of the cooling means, that is preferably the duct-like pipes is facilitated since the respective parts of the stator are easily accessible.

Preferably, the ends of adjacently disposed sets of stator windings are bent in opposite directions which further enhances the accessibility to the duct-like pipes.

It is also thinkable that the course of the at least one cooling means at least partially corresponds to the course of the at least one cooling means at least partially corresponds to the course of at least one respective set of stator windings. With the shape of the respective set of stator windings and the shape of the cooling means being essentially the same, the contact area between the respective set of stator windings and the cooling means may be enhanced and thus, the cooling performance further improved. Thereby, even the area of the ends of the respective stator windings, i.e. the end windings is provided with sufficient cooling.

The sets of stator windings within one stator slot are preferably electrically insulated by at least one electrical insulating means. In such a way, damages caused by undesired electrical interactions, such as short circuits or the like between the respective sets of stator windings are inhibited. The electrical insulating means are preferable disposed in the contact area between the stator windings and the at least one cooling means, that is between the respective cooling means and the respective sets of stator windings in terms of an electrically insulating intermediate layer. The electrical insulating means is built of an electrically insulating material preferably showing an appropriate thermally conductive behaviour. Merely as an example, polymeric or ceramic parts available in various geometric shapes and thicknesses may be used as electrically insulating means.

The stator may be segmented in at least two stator segments adapted to build the stator. Hence, the stator may comprise several stator segments leading to improvements regarding handling, transport, service and maintenance of the stator arrangement.

Aside, the invention relates to an electric machine comprising a stator arrangement as described before. The electric machine is preferably used as a generator for a wind turbine, especially a direct drive wind turbine.

BRIEF DESCRIPTION OF THE DRAWINGS

In the following, the invention is described in detail as reference is made to the figures, whereby.

DETAILED DESCRIPTION OF INVENTION

Figure 1:
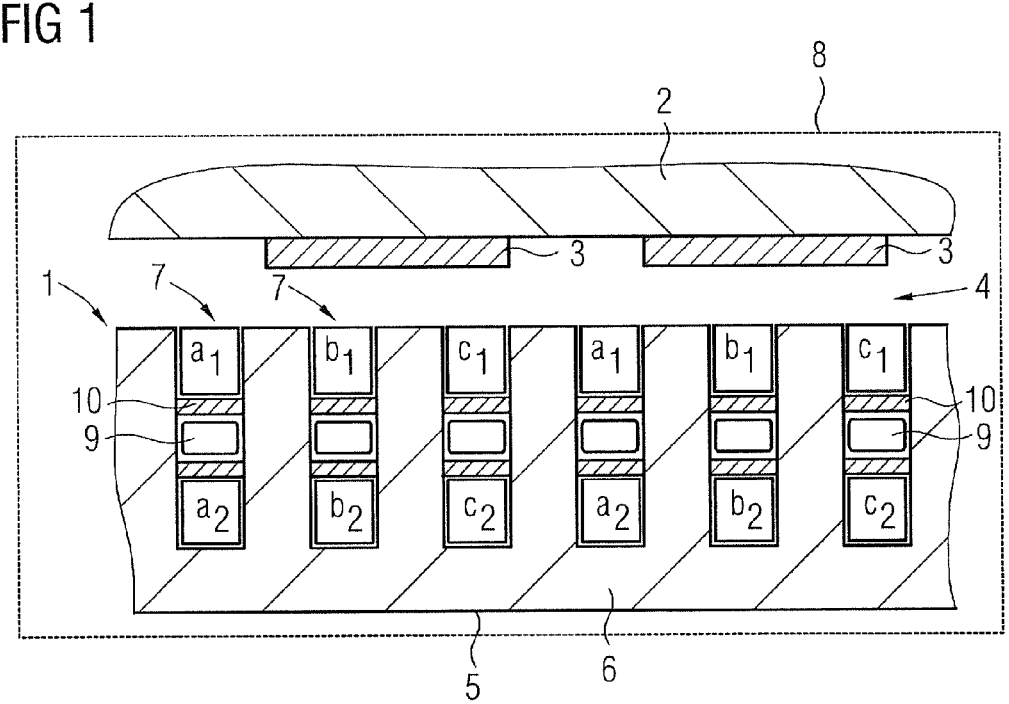
FIG. 1 shows a principle cut-out front view of a stator arrangement according to an exemplary embodiment of the present invention.

FIG. 1 shows a principle cut-out front view of a stator arrangement 1 according to an exemplary embodiment of the present invention and a respective rotor 2. The rotor 2 comprises several permanent magnets 3 and surrounds the stator arrangement 1, whereby an air gap 4 is provided between the stator arrangement 1 and the rotor 2. Generally, a reverse arrangement, that is the stator arrangement 1 surrounding the rotor 2 is applicable as well.

The stator arrangement 1 comprises a stator 5 having a stator yoke 6 particularly built of several laminated stacked metal plates (not shown). The stator yoke 6 comprises a number of axially extending stator slots 7.

The stator arrangement 1 and the rotor 2 are components of a three-phase electric machine 8 indicated by the rectangle. The electric machine 8 has a double-layer configuration, that is each slot 7 comprises two layers or sets of stator windings.

The notation of the respective sets of stator windings is as follows: the letters a, b, c indicate the phase of current, the index 1, 2 indicates the position of the respective set of stator windings within the slot 7, whereby index 1 means top position and index 2 means bottom position. The index further represents a correlation of the respective sets of stator windings to respective first and second electrical converter units (not shown), whereby all sets of stator windings having the index 1 are related to a first electrical converter unit and all sets of stator windings having the index 2 are related to a second electrical converter unit.

With respect to the left slot 7, the inventive principle will be explained in more detail. The slot 7 comprises a set of stator windings $a_1$ in the top position followed by a cooling means 9 in the shape of a duct-like pipe made of a metal such as copper or the like which cooling means 9 is followed by another set of stator windings $a_2$ in the bottom position, i.e. the cooling means 9 is disposed between the respective adjacently disposed sets of stator windings $a_1$, $a_2$. The same applies to the remainder of the slots 7, that is the respective sets of stator windings $b_1$, $b_2$, $c_1$, $c_2$ are also separated from each other by means of a respective cooling means 9. In such a way, the stator arrangement 1 is provided with an improved highly efficient cooling means 9 since the cooling means 9, that is the duct-like pipe has two contact sites with the respective sets of stator windings $a_1$, $a_2$, $b_1$, $b_2$, $c_1$, $c_2$. Thus, the respective cooling means 9 is in contact with the respective upper set of stator windings $a_1$, $b_1$, $c_1$ as well as the respective lower set of stator windings $a_2$, $b_2$, $c_2$, thereby essentially enhancing thermal exchange and cooling capability by factor 2 in comparison to conventional cooling means.

Aside, the assembly of the stator arrangement 1 is eased since first, the lower sets of stator windings $a_2$, $b_2$, $c_2$ have to be installed, second, the respective cooling means 9 have to be installed and lastly, the top sets of stator windings $a_1$, $b_1$, $c_1$ have to be installed. Likewise, service and maintenance of the stator arrangement 1 is eased as well.

The inventive principle also applies to a stator arrangement 1 with a three—or more—layer configuration, that is a stator arrangement 1 having more than two respective sets of stator windings disposed within each slot 7.

In order to avoid undesired electrical interactions between the respective sets of stator windings $a_1$, $a_2$, $b_1$, $b_2$, $c_1$, $c_2$ being radially disposed on top of each other within the respective slot 7, electrical insulating means 10 in the shape of layers of an electrically insulating material such as a polymer or ceramic material are provided. As is discernible, the electrical insulating means 10 are disposed in the contact area between the respective sets of stator windings $a_1$, $a_2$, $b_1$, $b_2$, $c_1$, $c_2$ and the respective cooling means 9.

According to the figures, each slot 7 is provided with two electrical insulating means 10. However, it is also possible to only provide one respective electrical insulating means 10 with an appropriate thickness and thus, appropriate electrical insulating properties.

Figure 2:
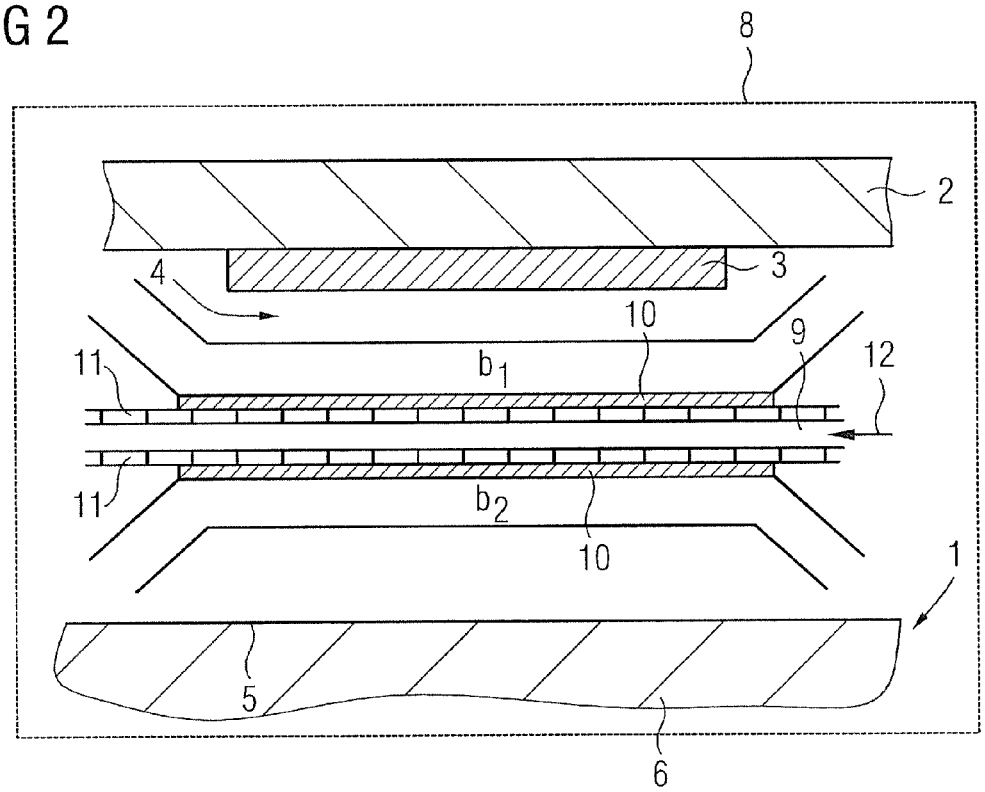
FIG. 2 shows a principle cut-out side view of a stator arrangement according to a further exemplary embodiment of the present invention.

FIG. 2 shows a principle cut-out side view of a stator arrangement 1 according to a further exemplary embodiment of the present invention. As is discernible from FIG. 2, the ends of the respective sets of stator windings $b_1$ are bent in radial upward, whereas the ends of the respective set of stator windings $b_2$ are bent in radial downward direction. Hence, the respective end windings of the sets of stator windings $b_1$, $b_2$ are bent in opposite direction so as to ease the insertion or replacement of the cooling means 9.

FIG. 2 further shows an additional insulating layer 11 at least partially encasing the cooling means 9 in order to provide an insulation of the wall of the cooling means 9 from the wall of the slot 7. The arrow 12 indicates the direction of flow of a liquid cooling medium such as water for instance circulating through the cooling means 9. The cooling medium is provided by an appropriate cooling system (not shown) associated to the stator arrangement 1 or the electrical machine 8. Thereby, respective connecting means such as hoses or the like providing a connection of the inlets and outlets of the cooling means 9 with the cooling system in terms of series or parallel connection.

Of course, the principle shown in FIG. 2 is applicable to all other slots 7 and sets of stator windings $a_1$, $a_2$, $c_1$, $c_2$ as well.

Figure 3:
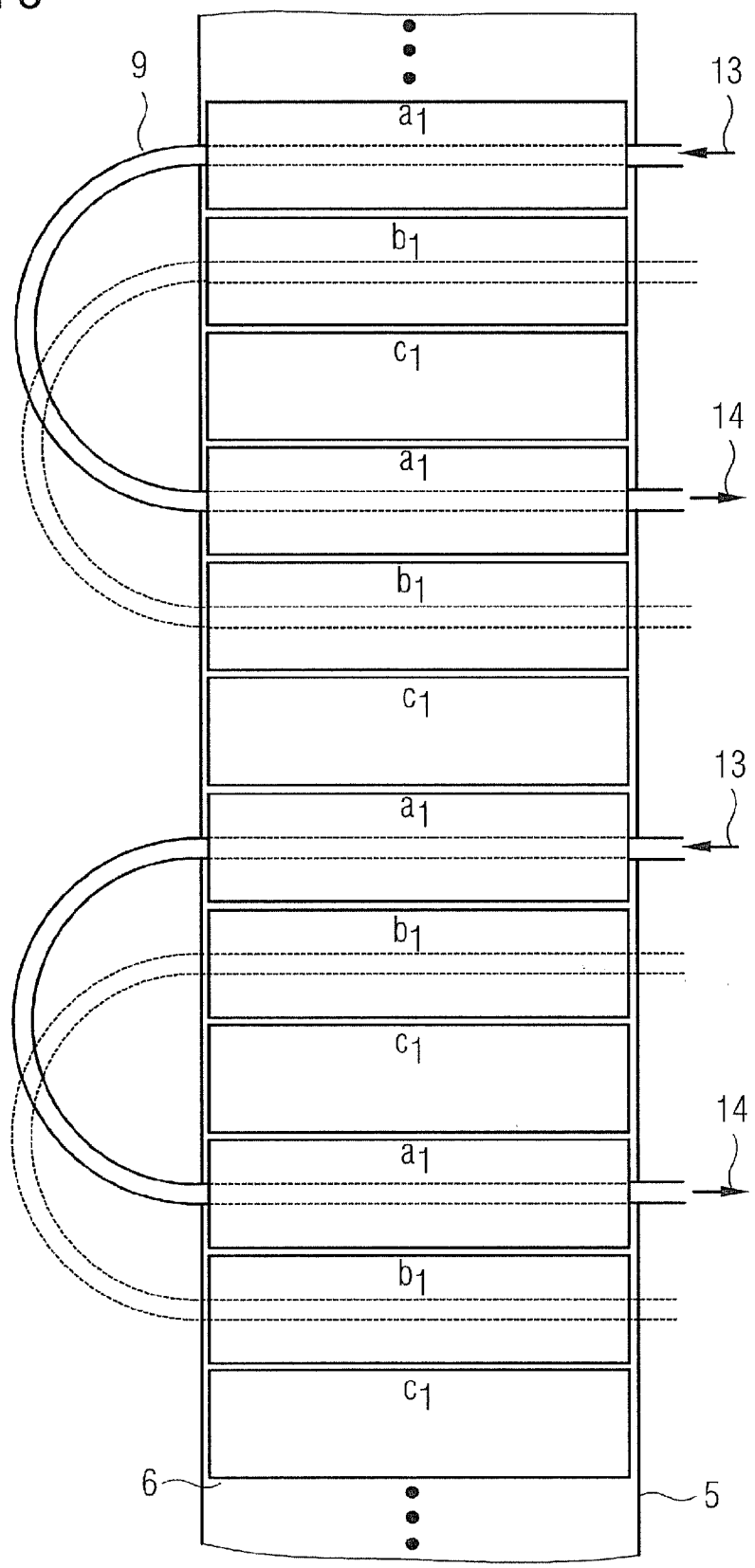
FIG. 3 shows a principle cut-out top view of a stator arrangement according to a further exemplary embodiment of the present invention.

FIG. 3 shows a principle cut-out top view of a stator arrangement 1 according to a further exemplary embodiment of the present invention. As is discernible from FIG. 3, the respective cooling means 9 essentially has the same course as the corresponding sets of stator windings $a_1$, that is, the cooling means 9 extends from the top set of stator windings $a_1$ to the corresponding subsequent top set of stator windings $a_1$ essentially in meander-like manner. In such a way, the contact area between the cooling means 9 and the respective set of stator winding $a_1$ is further enhanced providing better cooling properties.

FIG. 3 also shows the possibility of a parallel connection of the cooling means 9 with a cooling system (not shown) since the inlets indicated by arrow 13 and the outlets indicated by arrow 14 of adjacently disposed cooling means 9 are separately connected to the cooling system, whereas in a series connection of the cooling means 9, the outlets 14 of a cooling means 9 would be connected to the inlets 13 of an adjacently disposed cooling means 9. With the inlets and outlets 13, 14 being disposed on the same face side of the stator 5, the cooling means 9 as well as the inlets and outlets 13, 14 are easily accessible.

In such a way, also the end windings of the respective sets of stator windings $a_1$ are properly cooled since the cooling means 9 axially extends off the stator yoke 6.

As indicated by the dotted line, the respective set of stator windings $b_1$ may also be provided with a separate cooling means in the same manner as the set of stator winding $a_1$. The same applies to the sets of stator windings $c_1$. With the provision of more cooling means the cooling capability and cooling efficiency may be further improved, so that the constructive design of the electrical machine 8 may be more compact.

Even though it is not shown, the stator 5 may be segmented in at least two stator segments adapted to build the stator. In such a manner, transport, installation as well as service and repair of the stator 5 and the stator arrangement 1 as a whole is facilitated since the stator arrangement 1 comprises a modular setup consisting of a respective number of stator segments. Thus, the dimensions of the individual components of the stator arrangement 1 may be reduced.

The electric machine 8 is preferably a generator used in a direct drive wind turbine (not shown).

The invention claimed is:

1. A stator arrangement for an electric machine, comprising:
    a stator comprising a stator yoke with a plurality of axially extending stator slots, with each stator slot accommodating at least two adjacently disposed sets of stator windings, and
    at least one cooling device,
        wherein the at least one cooling device is disposed between the respective adjacently disposed sets of stator windings, and
    wherein the ends of at least one set of axially extending stator windings are bent in a radially upward direction or a radially downward direction.

2. The stator arrangement according to claim 1, wherein the at least one cooling device includes a duct-like pipe.

3. The stator arrangement according to claim 2, wherein the at least one cooling device includes a plurality of duct-like pipes connected in series or parallel.

4. The stator arrangement according to claim 2, wherein the inlet and outlet of the duct-like pipe is disposed on the same face side of the stator yoke.

5. The stator arrangement according to claim 2, wherein the duct-like pipe is made of a thermally conductive material, particularly a metal, especially aluminium, copper or stainless steel.

6. The stator arrangement according to claim 1, wherein the ends of the set of axially extending stator windings radially above the cooling device are bent in radially upward direction, and
    wherein the ends of the set of axially extending stator windings radially below the cooling device are bent in a radially downward direction.

7. The stator arrangement according to claim 1, wherein the course of the at least one cooling device at least partially corresponds to the course of at least one respective set of stator windings.

8. The stator arrangement according to claim 1, wherein the sets of stator windings within one stator slot are electrically insulated by at least one electrical insulating device.

9. The stator arrangement according to claim 8, wherein the electrical insulating device is disposed in the contact area between the stator windings and the at least one cooling device.

10. The stator arrangement according to claim 1, wherein the stator is segmented in at least two stator segments adapted to build the stator.

11. An electric machine, comprising:
    a rotor, and
    a stator arrangement according to claim 1.

12. The electrical machine of claim 11, wherein the electrical machine is a generator of a wind turbine.

* * * * *